Figure 1:
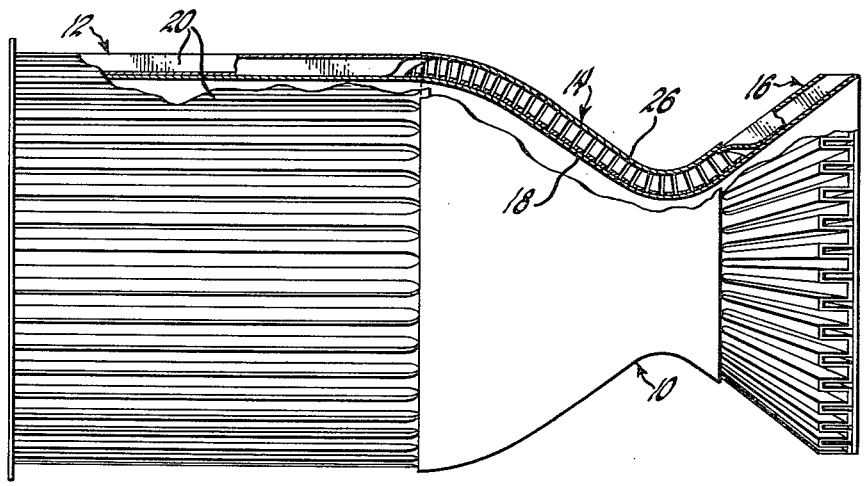

INVENTORS
Eugene Dent, &
Charles R. Moffett
BY
R. R. Barnard
ATTORNEY

July 10, 1962 E. DENT ETAL 3,043,103
LIQUID COOLED WALL
Filed Oct. 10, 1958 2 Sheets-Sheet 2

INVENTORS
Eugene Dent, &
Charles R. Moffett
BY R. P. Barnard
ATTORNEY

United States Patent Office 3,043,103
Patented July 10, 1962

3,043,103
LIQUID COOLED WALL
Eugene Dent and Charles R. Moffett, Indianapolis, Ind., assignors to General Motors Corporation, Detroit, Mich., a corporation of Delaware
Filed Oct. 10, 1958, Ser. No. 766,555
2 Claims. (Cl. 60—35.6)

The requirement for sturdy lightweight metal structures particularly as required in aircraft engine and air frame designs has led to the development and use of thin sheet metal members with corrugated back-up or stiffener sheets suitably affixed thereto. Such a construction is potentially suitable for use in high temperature environments since it is possible to convey coolant through the corrugations.

The use of such reinforced sheet metal construction, however, has been limited to more or less regular or linear configurations due to the difficulty of shaping such reinforced sheets transversely of the corrugations. The present invention relates to a method of forming such reinforced sheet metal members in a way as to provide flexibility and hence formability transversely of the corrugations and thereby permitting uses previously precluded.

For purposes of illustration, the subject invention has been shown as adapted to the construction of a turbine exhaust nozzle which is generally of annular construction and includes a converging-diverging section intermediate its ends. It is such a converging-diverging construction which has made previous forms of such reinforced sheet metal structures inapplicable. In general, the use of corrugated reinforcing sections with sheet metal elements is to lend strength to the sheet metal members against transverse forces which otherwise would tend to buckle such sheets. Therefore, in endeavoring to shape such an exhaust nozzle to provide the irregular or non-linear converging-diverging cross section resistance is met by the traditionally formed corrugated members.

In the present invention the opposite faces of the corrugated reinforcing members are alternately slotted at axially spaced points throughout the length of the portion to be irregularly formed. Additionally, and to insure that such portion of the assembly of the corrugated member is still capable of conducting a coolant therethrough a second sheet metal member is provided on the opposite side of the corrugated members from the base sheet metal member. In this manner sufficient transverse flexibility is introduced into the reinforced lightweight structure to permit irregular formation, i.e., deformation transversely of the corrugation axes.

As will be apparent from the detail description which follows, the subject double wall deformable construction may be utilized alone or in combination with the reinforced single wall construction as in the illustrated turbine exhaust nozzle construction.

The details as well as other objects and advantages of the present invention will be apparent from a perusal of the description which follows.

Figure 2:
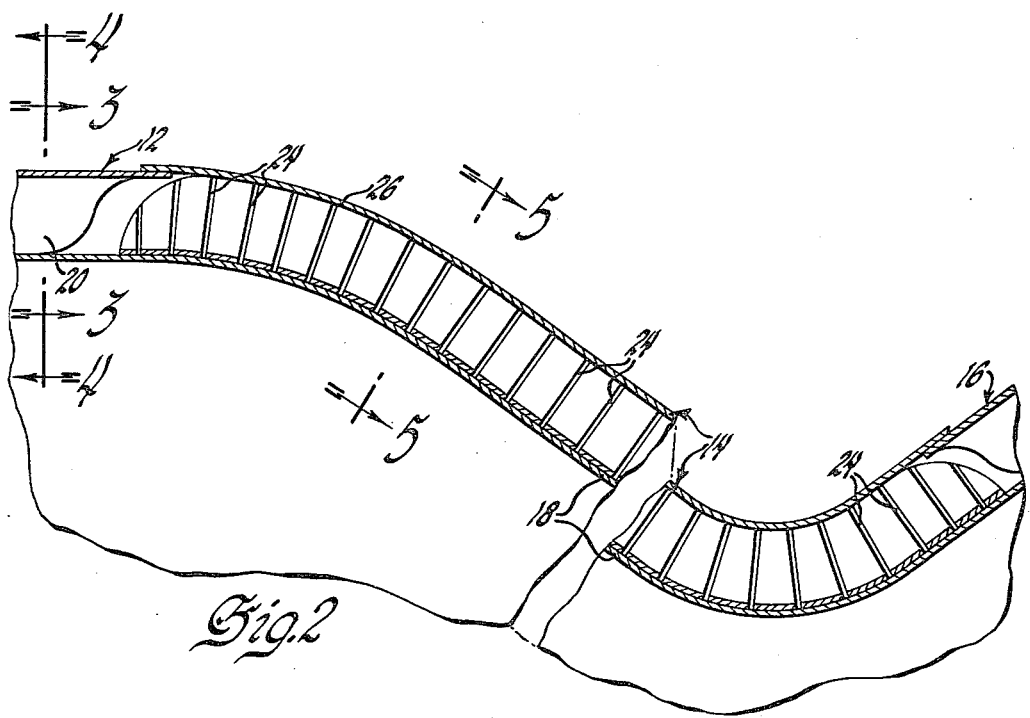
Figures 3, 4:
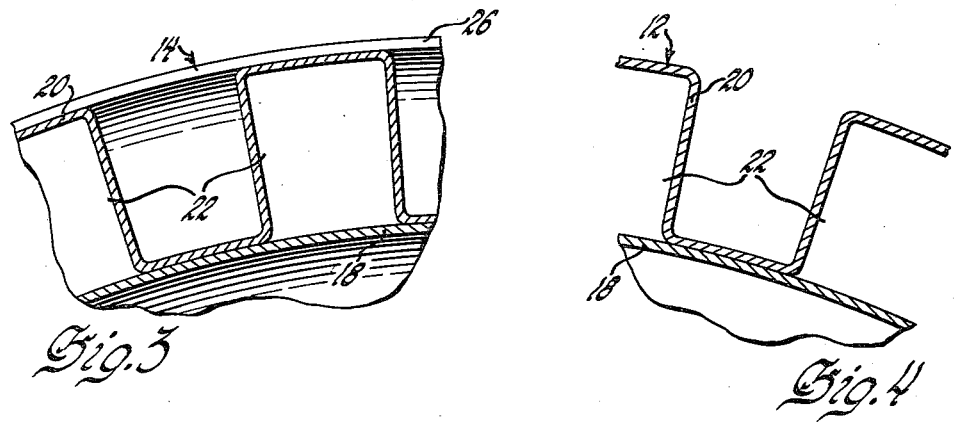
Figure 5:
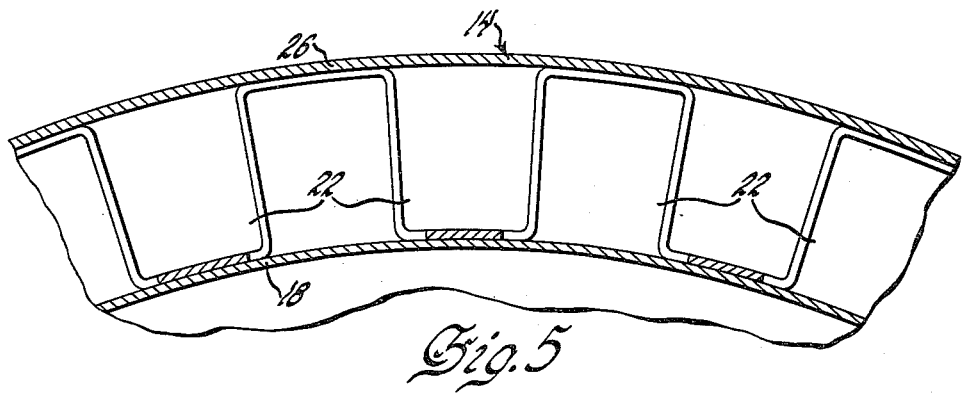
Figure 6:
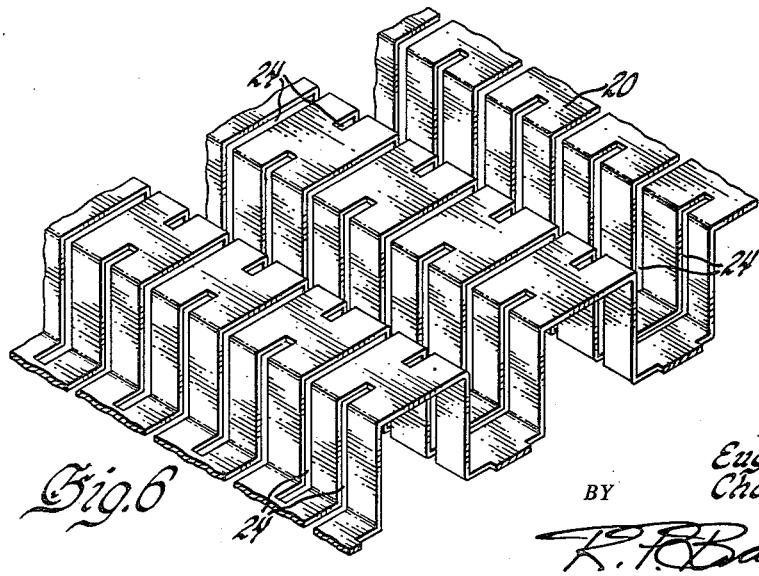

In the drawings:
FIGURE 1 is a partially sectioned view of an exhaust nozzle construction embodying the subject invention;
FIGURE 2 is a partial enlargement of the converging-diverging portion of FIGURE 1;
FIGURES 3, 4 and 5 are sections along lines 3—3, 4—4 and 5—5 of FIGURE 2; and
FIGURE 6 illustrates a form of slotted reinforcing member.

As already noted, for purposes of illustration, the subject invention has been shown as applied to the construction of an exhaust nozzle 10 of the type which might be used on engines of the turbojet, ram jet or rocket type or with any ducted fan arrangement requiring the converging-diverging construction as shown.

Referring to FIGURE 1, exhaust nozzle 10 includes a first straight or linear section 12, a converging-diverging or non-linear section 14 and a second linear or frusto-conical section 16.

Referring now to FIGURES 3 and 4 it will be seen that the linear sections 12 and 16 of the exhaust nozzle are formed by providing an inner or base sheet member 18 upon which is suitably fixed a corrugated reinforcing sheet member 20. Reinforcing member 20 includes alternately open portions 22 which coact with base sheet 18 to form a plurality of longitudinally extending openings or passages. By a corrugated member is meant one formed with alternate ridges and grooves. As illustrated, the corrugations are of rectangular cross section although any cross sectional form compatible with the broad definition is comprehended.

As best seen in FIGURES 1, 2 and 5, irregular section 14 of exhaust nozzle 10 also includes base sheet 18 and corrugated reinforcing member 20. Additionally, however, each corrugation 20 includes a plurality of longitudinally spaced slotted portions 24. Transverse slots 24 are best seen in FIGURE 6. Each corrugation includes alternate slots one of which completely cuts through the ridge and extends partially into the adjacent groove. The next longitudinally spaced slot is in effect shifted transversely so as to completely cut through the adjacent groove and only partially through the ridge.

In thus slotting corrugations 20 transversely of the axes of the passages 22 formed thereby, it is apparent that the corrugations are weakened in the direction normal to their axes. Accordingly, it becomes possible to deform the slotted portion of corrugated sheet 20 without buckling the corrugation.

The number and manner in which the slots are applied to the corrugations are variable. In general sufficient slots are provided in the corrugations to make the reinforced member flexible in the degree required by the environment in which the sheet member is to be used. In other words, if the reinforced sheet is to be formed to provide rather abrupt changes in cross section, then relatively more slots will be required whereas if the member is only to be slightly deformed considerably fewer slots may be employed.

As best seen in FIGURE 6, slots 24 are actually of two types; those which extend from a ridge of the corrugations into adjacent grooves and those which extend from a groove into adjacent ridges. The two types are longitudinally alternated to provide maximum flexibility for the assembly.

While slotting section 14 as described provides the needed flexibility to permit the converging-diverging formation, it is apparent that the slotting adversely affects the coolant carrying capacity of corrugation passages 22. Accordingly, the slotted corrugated section is combined with a second backing sheet 26 enclosing the corrugations and permitting the slotted section to transmit suitable coolant therethrough.

Where the double walled-reinforced member is to be combined with linear or non-deformed sections, such as those indicated at 12 and 16 in FIGURE 1, the corrugated stiffening member for the latter sections need not be transversely slotted and the added backing sheet 26 not extended thereover.

It is also intended that the entire exhaust nozzle 10 may be formed of a single continuous base sheet 18 having the corrugated reinforcing sheet 20 fixed thereto. Sheet 20 may be slotted at section 14 and the second base sheet 26 added thereover. Subsequently the fabricated structure may be formed to provide the appropriate converging-diverging configuration.

If desired, it would be possible to preform the individual sections 12, 14 and 16 and subsequently assemble the same to provide the nozzle construction.

We claim:

1. A turbine exhaust nozzle of the type including a converging-diverging section in which the section includes a pair of spaced flexible sheet members and a corrugated reinforcing member secured therebetween, said corrugated member comprising alternate ridges and grooves, said ridges and grooves coacting with the sheet members to define a plurality of coolant passages therebetween, the axes of said passages being substantially parallel, a plurality of sets of discontinuous slots formed through adjacent ridges and grooves and extending transversely of said axes, each slot of one set extending continuously from one ridge to an adjacent ridge and across the groove intermediate said ridges, each slot of the other set extending continuously from one groove to an adjacent groove and across the ridge intermediate said grooves, said slots being spaced longitudinally of the ridges and grooves whereby said reinforcing member is rendered deformable in a direction normal to said sheet members.

2. A turbine exhaust nozzle as set in claim 1 in which said sets of slots are longitudinally alternated along said ridges and grooves.

References Cited in the file of this patent

UNITED STATES PATENTS

| 2,448,595 | Holbrook | Sept. 7, 1948 |
| 2,476,185 | Goddard | July 12, 1949 |
| 2,544,419 | Goddard | Mar. 6, 1951 |
| 2,571,631 | Trumpler | Oct. 16, 1951 |
| 2,819,731 | Louthan | Jan. 14, 1958 |
| 2,880,577 | Halford et al. | Apr. 7, 1959 |

FOREIGN PATENTS

| 882,208 | France | Feb. 22, 1943 |